United States Patent [19]
Rodwell et al.

[11] Patent Number: 6,164,348
[45] Date of Patent: Dec. 26, 2000

[54] METHOD AND ARRANGEMENT FOR INTRODUCING FLUORESCENT DYE INTO A SYSTEM TO BE LEAK TESTED

[75] Inventors: Anthony W. Rodwell, Cliffe, United Kingdom; Kenneth J. Kranz, Birmingham; Victor J. Shanley, St. Clair Shores, both of Mich.

[73] Assignee: Corrosion Consultants, Inc., Roseville, Mich.

[21] Appl. No.: 09/281,206

[22] Filed: Mar. 30, 1999

Related U.S. Application Data

[60] Provisional application No. 60/081,242, Apr. 9, 1998.

[51] Int. Cl.$^7$ ...................................................... B65B 3/04
[52] U.S. Cl. ................... 141/382; 141/3; 141/18; 141/383; 222/327; 222/391; 62/292
[58] Field of Search ................... 141/3, 18, 382, 141/383; 222/327, 391; 62/292

[56] References Cited

U.S. PATENT DOCUMENTS

| | | | |
|---|---|---|---|
| 4,948,016 | 8/1990 | Summons et al. | 222/327 |
| 5,826,636 | 10/1998 | Trigiani | 141/382 |
| 6,050,310 | 4/2000 | Trigiani | 141/382 |

*Primary Examiner*—J. Casimer Jacyna
*Attorney, Agent, or Firm*—John R. Benefiel

[57] ABSTRACT

A method and arrangement for supplying dye to a leak tester and injecting the dye into a sealed system by precharging a disposable plastic syringe with a sufficient volume of dye to conduct the leak testing. The precharged syringe is shipped to the tester who connects the syringe to a hose assembly having a check valve, and a Luer coupling adapter at one end and a Schrader at the other end, which is then connected to the system, and the syringe plunger advanced to inject the dye. An adjustable stop on the syringe plunger allows an accurately set portion of the total volume to be injected.

3 Claims, 3 Drawing Sheets

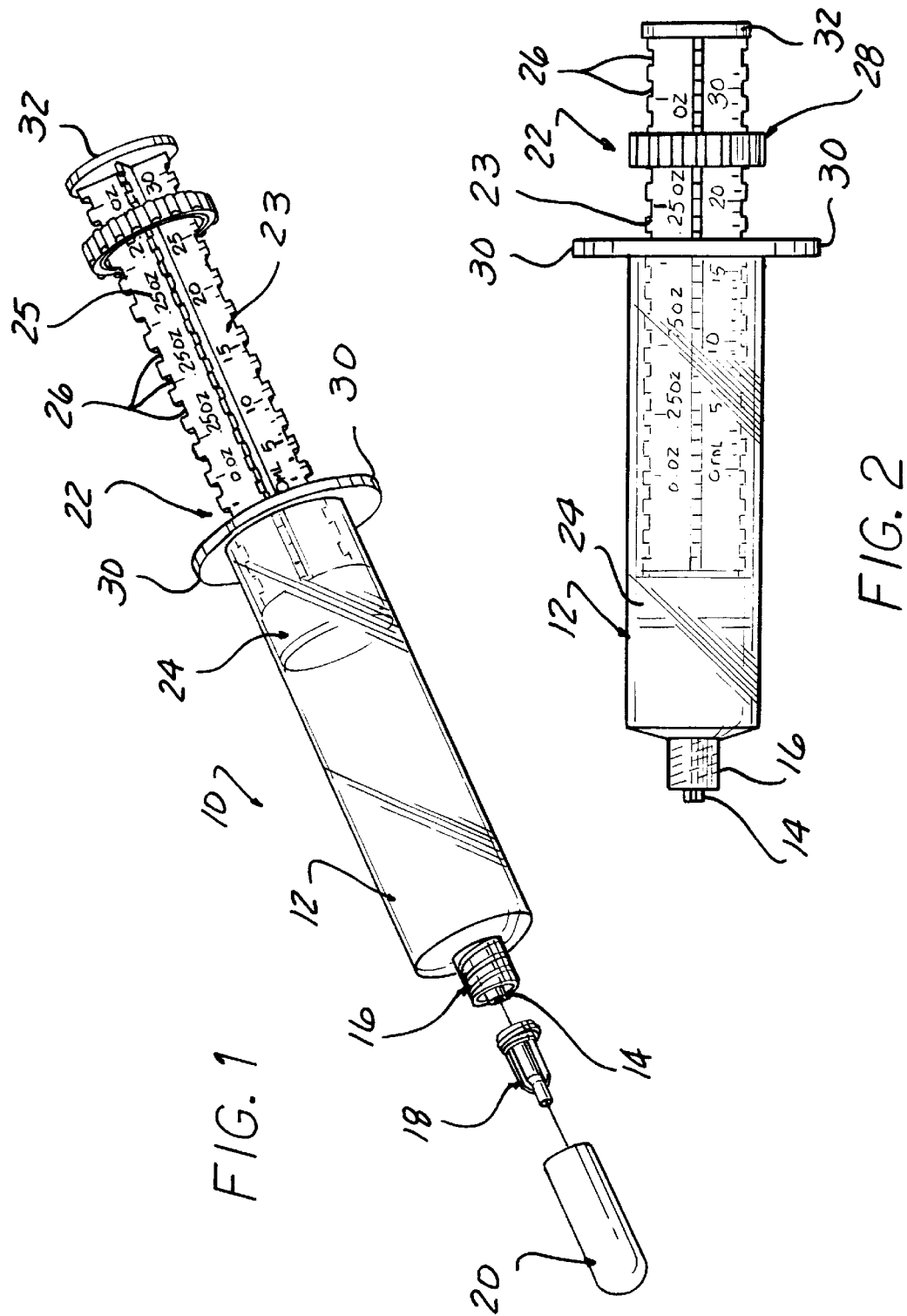

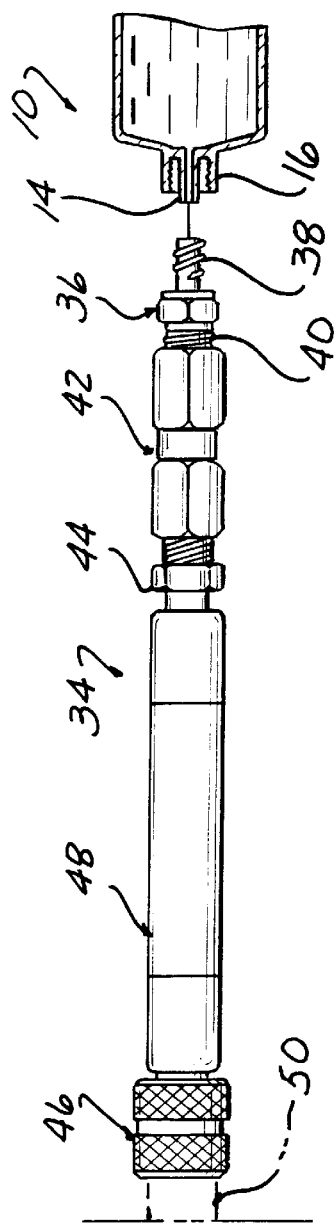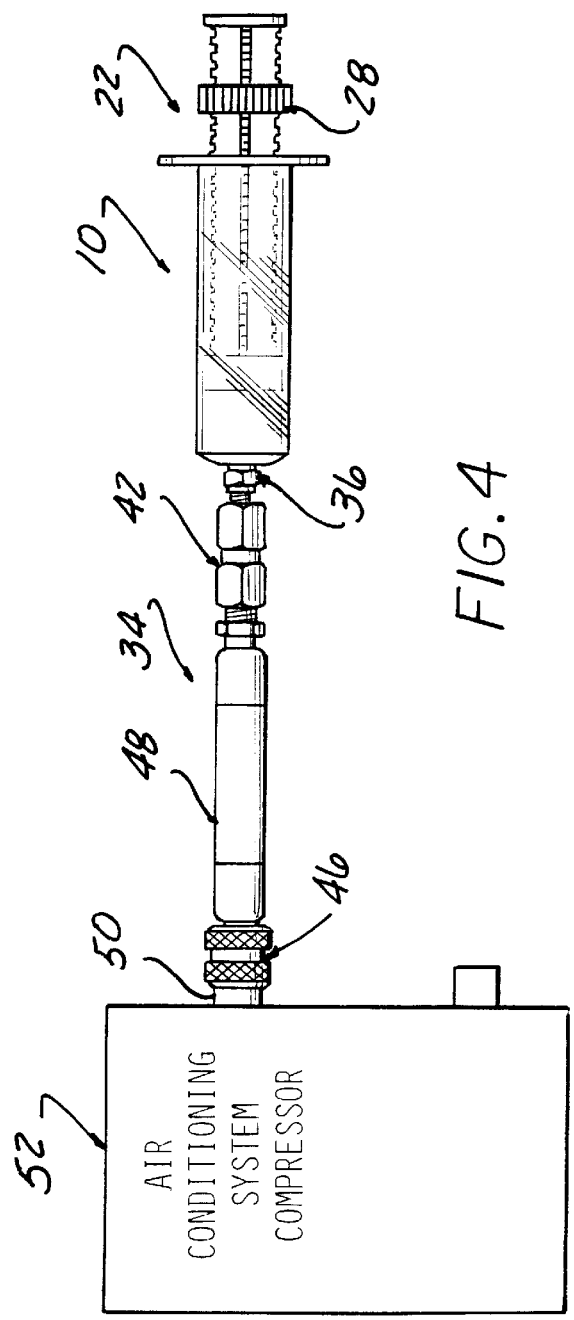

METHOD AND ARRANGEMENT FOR INTRODUCING FLUORESCENT DYE INTO A SYSTEM TO BE LEAK TESTED

CROSS REFERENCE TO RELATED APPLICATION

This application claims the benefit of the filing date of provisional application 60/081,242 filed on Apr. 9, 1998.

BACKGROUND OF THE INVENTION

This invention concerns leak testing of sealed systems containing a refrigerant, such as air conditioning and refrigeration equipment by introduction of a small volume of a fluorescent dye into the system and then observing potential leak points while illuminating the same with an ultraviolet light. Fluorescence of the dye in the refrigerant makes any leakage easily observed.

The dye is normally sold in small volume containers such as in small bottles or vials. The required volume of dye to use varies with the volume capacity of the system to be leak tested. The tester must measure out the required volume and prepare suitable fittings for introducing the required dye volume into the system. This is done using high pressure charging equipment normally used to charge the system, with an injector connecting the charger and the system, and a small volume of dye is poured into an injector reservoir. When a valve is opened, the refrigerant flows into the system, carrying the dye with it introduced via the injector.

This approach has several disadvantages, most significantly the necessity of bringing the bulky charging equipment to the compressor in order to inject the dye.

Furthermore, the tester must measure and handle the dye by pouring dye from a container into the injector reservoir, taking time and creating the possibility of spills. The injector must be purged every time to eliminate air, taking more time and wasting dye and refrigerant.

Separate mechanical chargers have been proposed, as described in U.S. Pat. Nos. 5,699,678 and 5,826,636 but these designs also require complicated mechanical devices and also require cartridges of a known volume to be used to control the quantity of dye being injected into the system.

It is the object of the present invention to provide a method and arrangement for injecting dye into sealed systems which does not require measuring or pouring of the dye, nor the use of bulky, complicated equipment, and which allows a known volume of dye to be injected.

SUMMARY OF THE INVENTION

The above recited object is achieved by the supplier of the dye prepackaging the dye in a sealed syringe and shipping the precharged syringe to the tester.

The syringe is adapted to be connected to an injector hose assembly, which includes a Luer coupling to pipe thread adapter, a check valve, and a hose having a Schrader valve coupling with an antiblow back valve and connected to the check valve at the other end.

The hose assembly with the coupled syringe is connected to the low pressure side of the air conditioning/refrigeration system to be tested.

The plunger of the syringe is marked with graduations and has a stop ring threaded thereon allowing the setting of a given injection volume by selectively limiting the stroke of the plunger. The locking ring is adjusted to the desired volume setting, and the plunger stroked to the extent allowed by the stop ring. The hose assembly is then disconnected, and leak inspection performed.

The hose assembly may be air purged when first used before being hooked to the system by advancing the plunger a short distance until dye exits the free end. The hose remains fully charged to eliminate the need for purging in subsequent uses.

DESCRIPTION OF THE DRAWINGS

FIG. 1 is a partially exploded perspective view of a precharged syringe, plug and sealing cap used in the present invention.

FIG. 2 is a side view of the syringe shown in FIG. 1.

FIG. 3 is a side elevational view of a R12/R22 hose assembly used in the present invention and a fragmentary end view of the syringe.

FIG. 4 is a side view of the entire combination and a diagrammatic representation of a system which is to be charged with a predetermined volume of dye.

DETAILED DESCRIPTION

Figure 5:
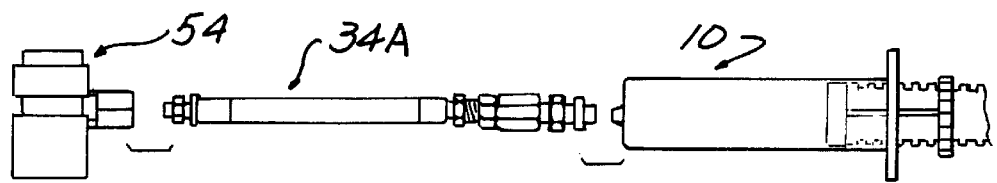
FIG. 5 is an exploded side view of the precharged syringe, hose assembly and a service coupler used with ozone friendly refrigerant systems.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, the dye will be prepackaged by the supplier of the dye in a sealed syringe 10 (FIGS. 1 and 2). The syringe is preferably has a volume of 30 ml, which will allow for several injections of dye of ¼ ounce each, a sufficient volume to leak test a typical automotive air conditioning system; or, for fewer larger volume injections of dye into a building air conditioning system.

Suitable disposable syringes 10 are commercially available, at low cost, being constructed of a molded plastic having ample strength and stiffness to resist the low to moderate pressures involved (40 psi).

The syringe 10 includes a barrel 12 adapted to be precharged with a volume of dye.

An outlet tube 14 at one end of the barrel 12 communicates with he interior space thereof. The tube 14 is surrounded with a "Luer" coupling which comprises an internal thread of a form which creates a tight seal with an element advanced thereinto.

A storage sealing plug 18 is threaded into the Luer coupling 16 to prevent the escape of dye.

A flexible shipping cap 20 may also be provided to capture any seepage which may occur during air transport due to low pressures experienced during a flight.

A plunger 22 includes a sealing piston 24 slidable within the barrel 12 to force the dye contents out the outlet tube 14. The plunger 22 is constructed with four orthogonal crossed webs 23, extending axially from one side of the piston 24, each web being notched 26 along the outer edge. The notches 26 define a helical "thread" receiving an inner projection of a stop ring 28 which can be thereby fixedly positioned axially at any point along the length of the webs 24 by being threadedly advanced in either direction. A series of graduation markings 25 allow setting of a desired injection volume by moving the ring 28 to that setting.

The locking ring 28 is adapted to move into abutment with projecting ears 30 formed on the upper end of the barrel 12 when the plunger 22 is stroked.

The locking ring 28 may be initially abutted against the flange 30 to prevent advance of the plunger 22 during shipping and handling.

An end plate 32 provides a convenient surface to exert thumb pressure with the fingers hooked on the ears 30 when injecting dye.

FIG. 3 and 4 show a hose assembly 34 with which the precharged syringe 10 is used. The hose assembly 34 includes a pipe thread to Luer coupling thread adapter 36, having one end 38 mateable with the Luer coupling 16 and receiving the outlet tube 14.

The other end 40 of the adapter 36 is threaded to a check valve fitting 42, preventing back flow to the syringe 10. The check valve fitting 42 is threaded to a hose end fitting 44 connected to one end of a flexible high pressure hose segment 48.

A Schrader valve coupling 46 is connected to the other end of the hose segment 48, adapted to be threadably connected to a Schrader valve 50 of the low pressure side of an air conditioning/refrigeration system compressor, Schrader coupling 46 includes an antiblow back valve preventing the escape of refrigerant.

The hose assembly 34 is designed to withstand the high pressure side of the air conditioning/refrigeration system for safety purposes.

In use, the syringe 10 is connected to the hose assembly 34, after removal of plug 18 and cap 20. The hose assembly is purged by slight advance of the plunger 22 after the locking ring 28 is backed off sufficiently.

The hose assembly 34 and syringe 10 are together connected to the Schrader valve 50 on the low pressure side of the system. The stop ring 28 is adjusted to set the desired volume of dye to be injected. Once purged, the hose assembly 34 holds a full volume of dye, so that subsequent purges should not be necessary.

The plunger 22 is then depressed to inject the selected volume of dye into the system 52, the moderate pressure exerted by the syringe 10 with finger pressure adequate to open check valve 42 and overcome the low pressure in the system 50.

The syringe 10 is protected from any high pressure that might be inadvertently exerted on the check valve 42 as by a wrong assembly which thereby insures the safety of the procedure, yet allowing dye injection by the compact and lightweight syringe 10.

According to one aspect of the invention, the supplier of the dye precharges the syringe 10 with dye, which is then sealed and shipped to the tester, who uses the syringe with the hose assembly, as described above.

FIGS. 3 and 4 show an assembly suitable for Freon type systems.

Figure 6:
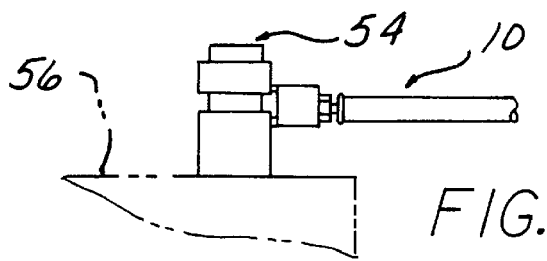
FIG. 6 is a view of the hose and service coupling of FIG. 5 and a fragmentary view of a connected air conditioning/refrigerant systems.
Figure 7A:
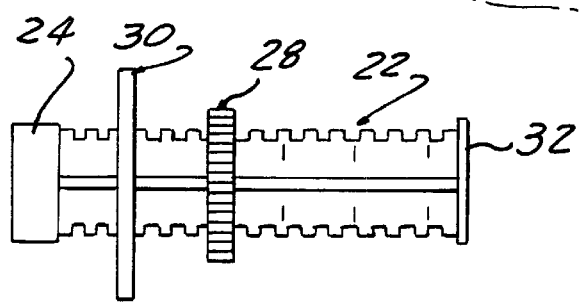
FIGS. 7A–7D show the relationship of the syringe parts for several successive injections.
Figure 7B:
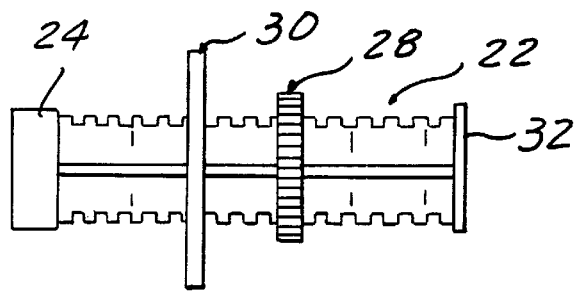
Figure 7C:
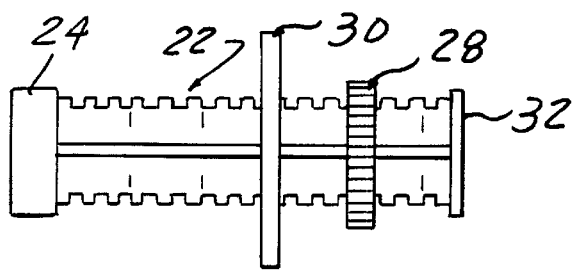
Figure 7D:
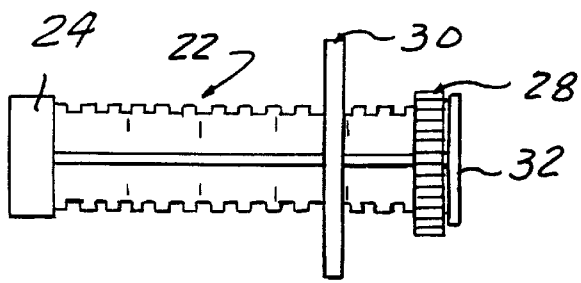

FIGS. 5 and 6 show use with systems using more recent environmentally friendly refrigerants such as R134A.

Such systems use a service coupler 54 which also acts to retain dye in the hose assembly 34A after air purging.

FIGS. 7A–7D show the adjustments used for successive injections of 0.25 ounce dye volumes, as would be typical of automotive air conditioning systems.

While the above concerns the injection of a leak testing dye into a refrigeration system, it is also possible to use the same for adding a small volume of lubricant to the system by packaging the syringe with lubricant, and injecting the same using the hose assembly as described.

What is claimed is:

1. A method of injecting a small volume of leak detection dye into a sealed system containing a refrigerant, said system including a low pressure side accessed for refrigerant charging by a Schrader valve, said method including the steps of:

precharging a syringe with a volume of said dye, said syringe having a barrel, a plunger movable in said barrel to a discharge end of said barrel, a Luer coupling at said discharge end of said barrel;

connecting one end of a hose assembly to said Luer coupling by an adapter;

providing a check valve in said hose assembly preventing the communication of fluid pressure to said syringe through said hose assembly;

connecting the other end of said hose assembly to said Schrader valve; and injecting dye from said syringe into said system through said hose assembly by advancing said plunger in said barrel.

2. The method according to claim 1 further including the step of providing an adjustable stop on said plunger and setting said stop so as to only partially advance said plunger and to inject only a portion of a volume of dye in said syringe.

3. The method according to claim 2 further including the step of air purging said hose assembly prior to connection to said system by advancing said plunger until a discharge of dye at said other end occurs, and retaining dye in said hose assembly after air purging.

* * * * *